May 10, 1938.     D. I. LEVINE     2,116,796
SPRING ASSEMBLY
Filed March 9, 1936
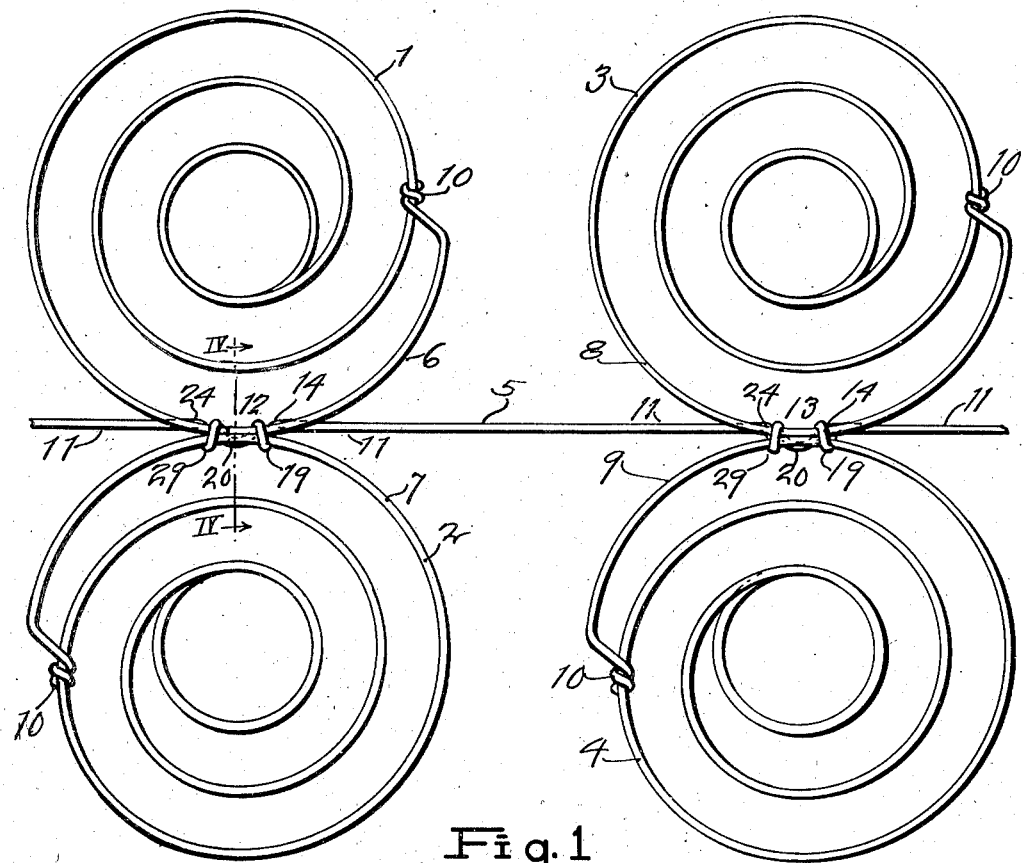
Fig.1
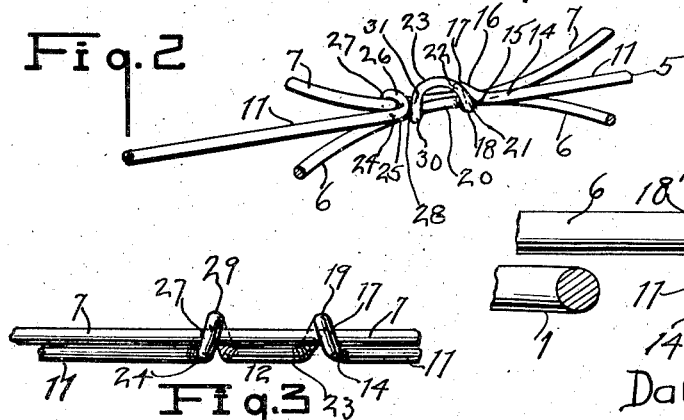
Fig.2
Fig.3
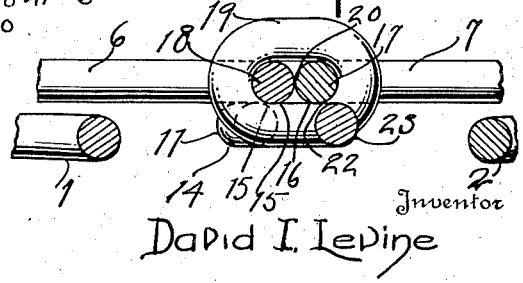
Fig.4
Inventor
David I. Levine
By Aaron Feinberg
Attorney Patented May 10, 1938

2,116,796

UNITED STATES PATENT OFFICE 2,116,796

SPRING ASSEMBLY

David I. Levine, Lynn, Mass., assignor to Lisson & Mellen Company, Lynn, Mass., a corporation Application March 9, 1936, Serial No. 67,988

5 Claims. (Cl. 5—273)

This invention relates to spring assemblies for use in bed springs, automobiles, mattresses, cushions and the like containing a plurality of springs, such as are normally used as a foundation for upholstery.

A former method of assembling springs of this type and holding them in place as a part of a working unit, was by means of soft metal clips of various shapes wrapped around the outside coils of the springs and also including within them the stay wires usually provided to hold the springs in predetermined positions.

Also to prevent the rotation of the springs which sometimes developed, special deformations and off-sets were often pressed into the coils before the clips were applied.

A primary object of my invention is to produce an economical assembly of fewer parts, the individual springs of which are fastened together so that they remain in positive spaced relationship and do not rotate with respect to each other. Clips and deformations formerly used are entirely eliminated. A flat surface is presented on the top and bottom of the assembly, with no points or sharp edges to damage its enclosure or covering either when first assembled or, as often happens, after continued usage.

Material economies are effected by the elimination of the cost of pressing off-sets and deformations into the coils of the springs, thus also eliminating the necessity and cost of their special orientation during assembly.

Stamped-out clips, as used in the usual type of clip assembly, from their very nature must be made from material softer than spring steel and often work loose after continued use. Hence, in obviating their use, a definite improvement is made in the permanence of the assembly's strength, rigidity and association of parts. The cost of these clips is also avoided.

The coiled spring units used in my assembly are usually of the ordinary spiral variety, knot-ended, and in slight compression.

These springs are arranged in rows which are held in location by tie wires which pass between corresponding pairs of springs throughout the length of the assembly and which are fastened to the outside or terminal coils both on the top and bottom of these springs by my novel junction which is an integral part of the tie wire itself. These junctions are so arranged that they do not work loose although they allow sufficient flexing for their required usage.

Further objects of the invention will hereinafter appear from the following description of a preferred embodiment illustrative of the invention and shown in the accompanying drawings in which Fig. 1 is a plan view of an outer end portion of an assembly embodying the invention showing the disposition of the coils and their connection by a tie wire.

Fig. 2 is an enlarged perspective view from beneath showing the bottom of my novel junction.

Fig. 3 is an enlarged side view of the junction as shown in Fig. 1.

Fig. 4 is an enlarged section of the junction taken on the line IV—IV in Fig. 1.

Referring to the drawing, the spring assembly therein shown as illustrative of one embodiment of my invention comprises a plurality of coil spring units 1, 2, 3, 4 fastened together and held in spaced relationship by means of tie wires 5. As shown, the type of coil spring to which my invention is preferably, but not exclusively, applied, comprises terminal coils 6, 7, 8, and 9 having their ends 10 knotted to the next adjacent coil in the same unit in order to place the spring unit under slight compression. These spring units are preferably arranged in a plurality of rows, maintained in spaced relationship by the same tie wires which force together the companion coils against their normal flexure.

The contiguous spring units 1 and 2 have their terminal coils, 6 and 7 in juxtaposition and in the same plane. The tie wire 5 has rectilinear portions 11 and laterally offset U shaped loops 12 and 13 formed integrally therewith before being placed in an operative position.

One leg of the loop 12 and 13 has a bend 14 where it offsets from the rectilinear portion 11. Coil 6 bears on this leg at 15, coil 7 bears on it at 16. At 17 and 18, this leg forces coils 7 and 6 together. 19 is the flat outer surface which comes in contact with the covering material. Coils 7 and 6 come into contact at 20. Coil 6 again bears on the leg of the loop at 21, coil 7 bears on it at 22 while 23 is the end of this leg and the crown of the loop.

In like manner, the other leg of loop 12 and 13 has a bend 24, bearing points at 25 and 26, pressure points at 27 and 28. 29 represents its outer contacting surface. 30 and 31 are corresponding bearing points. This leg joins the other leg of the loop 12 and 13 at crown 23.

In my junction, one leg of the loop 12 offsets from the rectilinear portion 11, at bend 14 upon which coil 6 rests. This leg then passes under coil 6 which bears on it at point 15, thence under coil 7 which bears on it at point 16, thence it encircles coil 7 and coil 6 putting them under pressure at points 17 and 18 while presenting a flat outer surface at 19 and forcing the coils 7 and 6 together against their normal flexure at point 20. The leg of the loop then passes under coil 6 which bears on it at point 21 and under coil 7 which bears on it at point 22 ending in the crown 23 of the loop upon the side of which coil 7 rests.

Similarly the other leg of the same loop 12 offsets from the rectilinear portion 11, at bend 24, upon which coil 6 rests. This leg then passes under coil 6 which bears on it at point 25, thence under coil 7 which bears on it at point 26, thence encircling coils 7 and 6 putting them under pressure at points 27 and 28 presenting a flat outer surface at point 29 and forcing the coils 7 and 6 together, in conjunction with the other leg of loop 12, at the same point 20. This leg of the loop then passes under coil 6 which bears on it at point 30 and under coil 7 which bears on it at point 31, ending in the crown 23 of the said loop.

In the usual assembly, coils are merely placed tangent to each other or sometimes in an overlapping position.

In my invention corresponding segments of the terminal coils are held together under horizontal compression in a substantially parallel formation by the legs of the loop between points 17—18 and 27—28 and what were originally an arc of a circle on coil 6 between 18 and 28 and an arc of a circle on coil 7 between 17 and 27 are deformed by the tie wire into an essentially abutting relation throughout their lengths between 19 and 29 of the tie wire.

This prevents the rotation of each spring unit around its perpendicular axis.

The distance between 14 and 24 which designates the length of the opening of the loop, controls the pressure put on the coils 7 and 6 at 17—18 and 27—28 depending on the gauge of the wire used and the use to which the assembly is to be put.

As described, coil 6 bears on the tie wire loop at 15—21—30—25 and coil 7 bears on said loop at 16—22—31—26 producing uniform distribution of pressure on the novel junction.

Referring to Fig. 4, tie wire 11, being eccentric with the encircling loop formed over coils 6 and 7 and being in contact with the underside of coil 6, prevents the usual rotation of the tie wire and produces a novel restricted hinge action. The encircling portions of the legs passing over the coils 6 and 7 present flat, smooth, outer contact surfaces as shown at 19 and 29. If in the actual operation of my junction a load is applied to the terminal loops of a pair of companion coils, a combination two-fold retarded and restricted hinged action results. The action is first retarded because of the great friction between abutting coil sections which are deformed by heavy pressure into the shape shown and held in that shape by the encircling loops of the tie-wire. The action is then also counterchecked and restricted because of the definite abutting action of the tie wire on the bottom of each of the coils. The bottom of coil 6 abuts the tie wire at points 15 and 25, while the bottom of coil 7 abuts the tie wire at points 22 and 31. The symmetrical deflection of both terminal loops of a pair of companion coils is thus definitely limited by these sub-positioned abutments, to the range of normal usage, producing an equal and uniform double action that is a practical means between a hinged joint and a rigid clipped joint. Rotation, overriding and dislocation are entirely eliminated.

As above noted, this mode of junction is peculiar to my invention. In the form shown, this is accomplished while having each one of the springs an exact duplicate of every other one, but modifications in this respect fall within the scope of my invention.

For heavier duty, the offset loop may be longer and may be wrapped with another turn or more around the contiguous coils by spreading the opening of the legs and having the turns of the legs fall one within the other.

In certain instances, it may be advantageous to have adjacent loops 12 and 13 on the tie wire offset on opposite sides thereof to prevent excessive rotation of the tie wire itself.

Having described a preferred embodiment illustrative of my invention, I claim:

1. A spring assembly comprising a plurality of coiled spring units and tie wires having sub-positioned rectilinear abutting portions and spaced encircling loop portions formed integrally therewith, the adjacent segments of companion terminal coils of pairs of said spring units being held in a substantially parallel formation by and between the legs of said spaced encircling loop portions, said loop portions being sufficiently constricted on said terminal coils to hold them in said deformed formation against their natural resilience, the terminal coil of one of said spring units bearing on the rectilinear portion of said sub-positioned tie wire at points adjacent to the legs of said loop portion, said rectilinear portions being below and offset from the mid-way contacting portions of said parallel formation, limiting the downward hinged action of the said terminal coil.

2. A spring assembly comprising a plurality of rows of coiled spring units and tie wires having sub-positioned rectilinear abutting portions and spaced offset coil encircling loop portions cooperating therewith, said spring units having their terminal coils contiguous and in the same plane, said rectilinear portions of said tie wires abutting and underlying the bottom of one of the terminal coils of said unit, said coil encircling loop portions having their legs spaced apart and disposed under said terminal coil and said contiguous coil and bent to encircle both coils between said spaced legs, said coil encircling loop portions being sufficiently constricted on said terminal coil and said contiguous coil to bend them against their natural resilience into a substantially parallel formation between said spaced legs, the side of the crown of said encircling loop portion abutting said contiguous coil, said sub-positioned rectilinear portion preventing the remainder of said terminal coil from turning downwardly upon said abutting portion as an axis, said constricted spaced legs of said encircling loop portions and abutting crown of said loop frictionally retarding the downward hinged action of said contiguous coil.

3. A spring assembly comprising a plurality of coiled spring units, and tie wires having sub-positioned rectilinear abutting portions and offset spaced encircling loop portions, said rectilinear portions being disposed under one terminal coil of said spring unit, the legs of said encircling loop portion being spaced apart and winding completely around and under the adjacent segments of the companion terminal coils of pairs of said spring units, said encircling loop portions being sufficiently constricted on said terminal coils to deform them into a substantially parallel formation against their natural resilience, the side of the crown of said encircling loop portion abutting the companion coil of said unit, the bottom of each of said coils having a minimum of four bearing points on said tie wire, said sub-positioned rectilinear portion preventing the remainder of said terminal coil from turning downwardly upon said abutting portion as an axis.

4. A spring assembly comprising a plurality of coiled spring units and tie wires having sub-positioned rectilinear abutting portions and spaced coil encircling loop portions formed integrally therewith, the adjacent segments of the companion terminal coils of pairs of said spring units being sufficiently constricted by and between the spaced legs of the loops of said encircling loop portion to hold them in a substantially parallel formation against their natural resilience, the rectilinear portions of said tie wire abutting and underlying the bottom of one of said terminal coils and the side of the crown of the loop of said encircling portion abutting the companion terminal coil of said unit, said rectilinear portion preventing the remainder of said terminal coil from turning downwardly upon said abutting portion as an axis.

5. A spring assembly comprising a plurality of rows of coiled spring units, the adjacent segments of the companion terminal coils of pairs of said spring units being constricted against their natural resilience in a substantially parallel formation and being held in said formation by a tie wire having sub-positioned rectilinear abutting portions and laterally offset coil encircling loop portions at spaced intervals, said rectilinear portions abutting and underlying the bottom of one terminal coil, said encircling loop portions having their legs spaced apart and passing under, over, and under the said constricted segments, the side of the crown of said encircling loop portion abutting the said adjacent terminal coil, said sub-positioned rectilinear portion preventing the remainder of said terminal coil from turning downwardly upon said abutting portion as an axis.

DAVID I. LEVINE.